United States Patent
Masuda

(10) Patent No.: US 9,851,929 B2
(45) Date of Patent: Dec. 26, 2017

(54) PRINTING SYSTEM, INFORMATION PROCESSING DEVICE, AND PRINTING MACHINE

(71) Applicant: RISO KAGAKU CORPORATION, Tokyo (JP)

(72) Inventor: Shigeru Masuda, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/426,406

(22) Filed: Feb. 7, 2017

(65) Prior Publication Data

US 2017/0249110 A1  Aug. 31, 2017

(30) Foreign Application Priority Data

Feb. 26, 2016  (JP) ................. 2016-035207

(51) Int. Cl.
- *G06F 15/00* (2006.01)
- *G06F 3/12* (2006.01)
- *G06K 15/00* (2006.01)

(52) U.S. Cl.
CPC .......... *G06F 3/1213* (2013.01); *G06F 3/1206* (2013.01); *G06F 3/1231* (2013.01); *G06F 3/1248* (2013.01); *G06F 3/1286* (2013.01); *G06F 3/1293* (2013.01)

(58) Field of Classification Search
CPC .... G06F 3/1213; G06F 3/1206; G06F 3/1231; G06F 3/1248; G06F 3/1293; G06F 3/1286

USPC .............. 358/1.15, 1.13, 1.14, 1.1
See application file for complete search history.

(56) References Cited

U.S. PATENT DOCUMENTS

| 8,537,396 | B2 | 9/2013 | Miyazaki |
| 2017/0131956 | A1* | 5/2017 | Kuroiwa ............... G06F 3/1276 |
| 2017/0132501 | A1* | 5/2017 | Yamakawa ......... G06K 15/1859 |

FOREIGN PATENT DOCUMENTS

JP  2012-22503  2/2012

* cited by examiner

*Primary Examiner* — Douglas Tran

(74) *Attorney, Agent, or Firm* — Greenblum & Bernstein, P.L.C.

(57) ABSTRACT

In a printing system, a print job data generating unit of an information processing device generates print job data that includes job settings data which includes at least one of mechanical initialization information and job registration information to be used in a printing machine and which is described in a format that can be parsed without performing RIP processing, and printing data in PDL format. An RIP preprocessing unit of the printing machine parses the job settings data included in the print job data to obtain at least one of the mechanical initialization information and the job registration information, and performs at least one of mechanical initialization requesting based on the mechanical initialization information and job registration based on the job registration information before an RIP processing unit performs the RIP processing.

3 Claims, 3 Drawing Sheets

PRINTING SYSTEM, INFORMATION PROCESSING DEVICE, AND PRINTING MACHINE

CROSS REFERENCE TO RELATED APPLICATION

This application claims benefit of priority under 35 U.S.C. §119 to Japanese Patent Application No. 2016-035207, filed on Feb. 26, 2016, the entire contents of which are incorporated by reference herein.

BACKGROUND OF THE INVENTION

1. Field of the Invention

The present invention relates to a printing system, an information processing device, and a printing machine.

2. Description of the Related Art

A printing system in which a personal computer transmits print job data in PDL (Page Description Language) format to a printing machine, and the printing machine performs printing based on the received print job data, has been known in the art.

In such a printing system, the printing machine receives the print job data in the PDL format, performs RIP (Raster Image Processor) processing, and generates image data. In the RIP processing, the print job data is first parsed and then rasterized to generate image data. The printing machine then performs the printing based on the image data generated by the RIP processing.

Patent Document 1 (Japanese Patent Application Laid-open No. 2012-22503) discloses a technology to accelerate the RIP processing by using a plurality of RIP modules to run multiple RIP processing in parallel.

However, the printing machine performs some other processes, apart from the RIP processing, upon receiving the print job data. These include processing such as mechanical initialization and job registration. In the mechanical initialization, mechanical parts such as a sheet conveying mechanism and a printing mechanism such as an inkjet head are mechanically recalibrated in accordance with the print job data received in the printing machine. In the job registration, the print job data received in the printing machine is registered in a job list.

The information required for performing the above-described processes is included in the print job data. The printing machine obtains such information by performing parsing of the print job data in the RIP processing. Therefore, if the parsing is not performed in the RIP processing, the mechanical initialization cannot be started, and depending on the time required for the mechanical initialization, completion of the mechanical initialization process gets delayed, resulting in delayed start of the printing. Moreover, the print job data cannot be registered unless the parsing is performed in the RIP processing. This may result in delayed status update so that the user cannot confirm whether the print job data has been received in the printing machine.

In the technology disclosed in Patent Document 1, although the RIP processing can be accelerated by use of a plurality of the RIP modules, unless the data parsing is performed in the RIP processing, the mechanical initialization or the job registration cannot be performed.

Accordingly, in a printing machine that has received print job data, waiting for the data parsing to be performed in the RIP processing in order to perform all the other processes apart from the RIP processing, results in process inefficiency. This demanded improvement in the efficiency of processes included in the RIP processing and the other processes that are performed in the printing machine upon receiving the print job data.

SUMMARY OF THE INVENTION

The present invention is made in view of the above discussion. One object of the present invention is to provide a printing system, an information processing device, and a printing machine that can improve efficiency in processes when receiving print job data in the printing machine.

According to a first aspect of the present invention, there is provided a printing system including: an information processing device that generates print job data; and a printing machine that generates image data based on the print job data generated by the information processing device and performs printing based on the generated image data, wherein the information processing device includes: a print job data generator that generates print job data including job settings data which includes at least one of mechanical initialization information and job registration information to be used in the printing machine and which is described in a format that can be parsed without performing RIP processing and printing data in PDL format; and a transmitter that transmits the print job data to the printing machine, and the printing machine includes: a receiver that receives the print job data transmitted from the information processing device; an RIP processor that performs the RIP processing on the printing data included in the print job data and generates the image data; and an RIP pre-processor that parses the job settings data included in the print job data to obtain at least one of the mechanical initialization information and the job registration information, and performs at least one of mechanical initialization requesting based on the mechanical initialization information and job registration based on the job registration information before the RIP processor performs the RIP processing.

According to a second aspect of the present invention, there is provided an information processing device including: a print job data generator that generates print job data including job settings data which includes at least one of mechanical initialization information and job registration information to be used in a printing machine and which is described in a format that can be parsed without performing RIP processing, and printing data in PDL format; and a transmitter that transmits the print job data to the printing machine.

According to a third aspect of the present invention, there is provided a printing machine that generates image data based on print job data generated by an information processing device, and performs printing based on the generated image data, the printing machine including: a receiver that receives print job data including job settings data which includes at least one of mechanical initialization information and job registration information to be used in the printing machine and which is described in a format that can be parsed without performing RIP processing, and printing data in PDL format; an RIP processor that performs the RIP processing on the printing data included in the print job data and generates image data; and an RIP pre-processor that parses the job settings data included in the print job data to obtain at least one of the mechanical initialization information and the job registration information, and performs at least one of mechanical initialization requesting based on the mechanical initialization information and job registration based on the job registration information before the RIP processor performs the RIP processing.

According to the first aspect of the present invention, the print job data generator of the information processing device generates the print job data that includes the job settings data which includes at least one of the mechanical initialization information and the job registration information to be used in the printing machine and which is described in a format that can be parsed without performing the RIP processing, and the printing data in the PDL format. Before the RIP processor performs the RIP processing, the RIP pre-processor of the printing machine parses the job settings data included in the print job data to obtain at least one of the mechanical initialization information and the job registration information, and performs at least one of the mechanical initialization requesting based on the mechanical initialization information and the job registration based on the job registration information. With this configuration, in the printing machine, the mechanical initialization can be started or the job registration can be performed before the RIP processing starts. The mechanical initialization, if started ahead of the RIP processing, can run in parallel with the RIP processing and as a result, for a longer time. This configuration enables the printing to be started earlier. Moreover, if the job registration can be performed before the RIP processing starts, then the job registration can be performed even along with the RIP processing of the previous print job data.

In this manner, according to the first aspect of the present invention, because the printing machine can efficiently perform the mechanical initialization or the job registration, the processes performed in the printing machine upon receiving the print job data can be performed efficiently.

According to the second aspect of the present invention, the print job data generator generates the print job data that includes the job settings data which includes at least one of the mechanical initialization information and the job registration information to be used in the printing machine and which is described in a format that can be parsed without performing the RIP processing, and the printing data in the PDL format. Then, the transmitter transmits the print job data to the printing machine. This configuration enables the printing machine to parse the job settings data included in the print job data and obtain at least one of the mechanical initialization information and the job registration information before the RIP processing is performed. As a result, because the printing machine can efficiently perform the mechanical initialization or the job registration, the processes performed in the printing machine upon receiving the print job data can be performed efficiently.

According to the third aspect of the present invention, the RIP pre-processor parses the job settings data included in the print job data to obtain at least one of the mechanical initialization information and the job registration information, and performs at least one of the mechanical initialization requesting based on the mechanical initialization information and the job registration based on the job registration information before the RIP processor performs the RIP processing. This configuration enables the printing machine to start the mechanical initialization or the job registration before the RIP processing starts. As a result, because the printing machine can efficiently perform the mechanical initialization or the job registration, the processes performed in the printing machine upon receiving the print job data can be performed efficiently.

DESCRIPTION OF THE EMBODIMENTS

Exemplary embodiments of the present invention will be described below with reference to the accompanying drawings.

Figure 1:
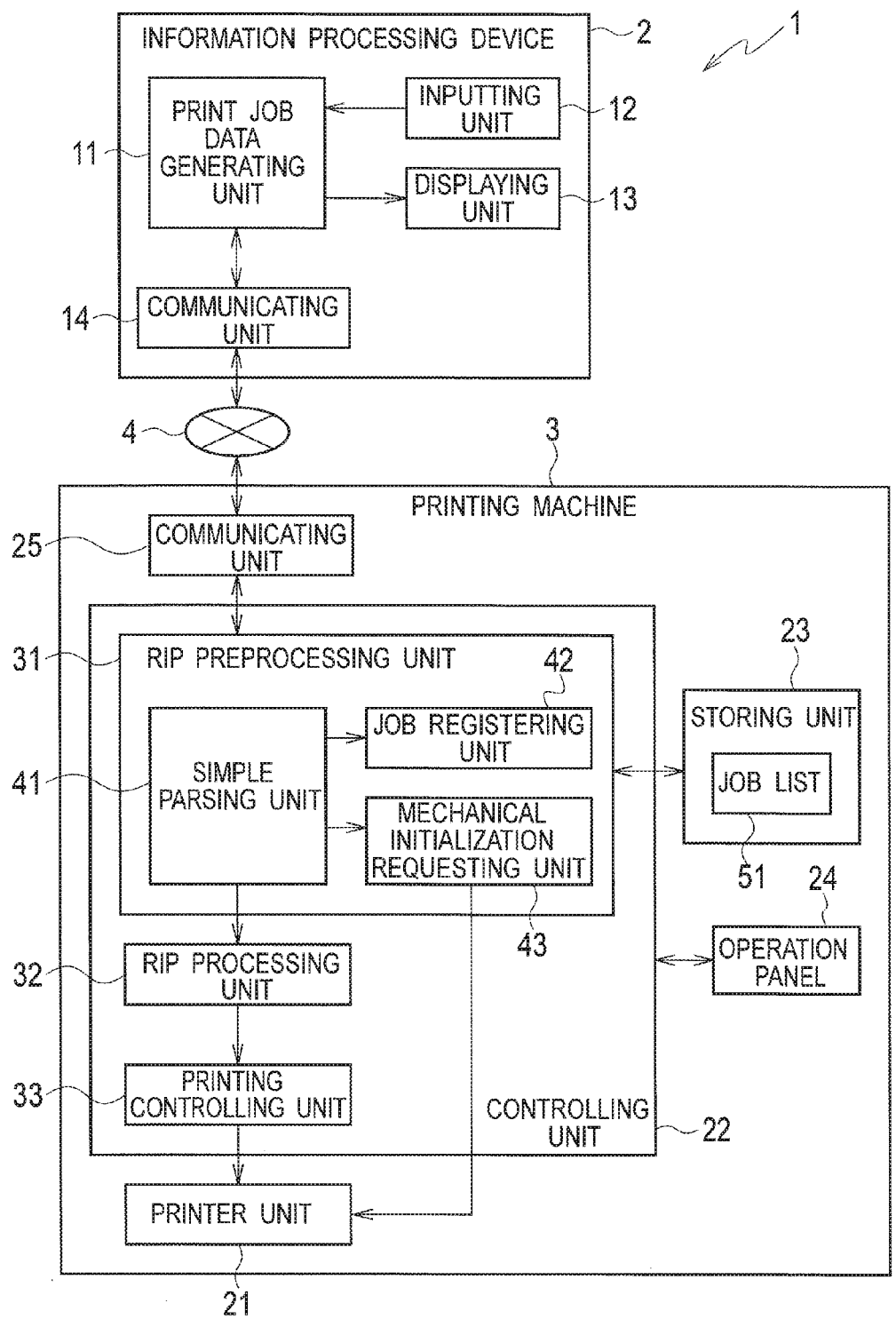
FIG. 1 is a block diagram showing a configuration of a printing system according to an embodiment of the present invention.

FIG. 1 is a block diagram showing a configuration of a printing system according to an embodiment of the present invention. As shown in FIG. 1, a printing system 1 includes an information processing device 2 and a printing machine 3. The information processing device 2 and the printing machine 3 are communicably connected to each other via a network 4. The network 4 is, for example, LAN (Local Area Network).

The information processing device 2 generates print job data and transmits it to the printing machine 3. The information processing device 2 is, for example, a personal computer. The information processing device 2 includes a print job data generating unit 11, an inputting unit 12, a displaying unit 13, and a communicating unit 14.

The print job data generating unit 11 generates print job data that causes the image data generated by a not-shown application to be printed by the printing machine 3. The CPU (Central Processing Unit) provided in the information processing device 2 executes a printer driver program stored in a storage device such as HDD (Hard Disk Drive) to form the print job data generating unit 11.

Figure 2:
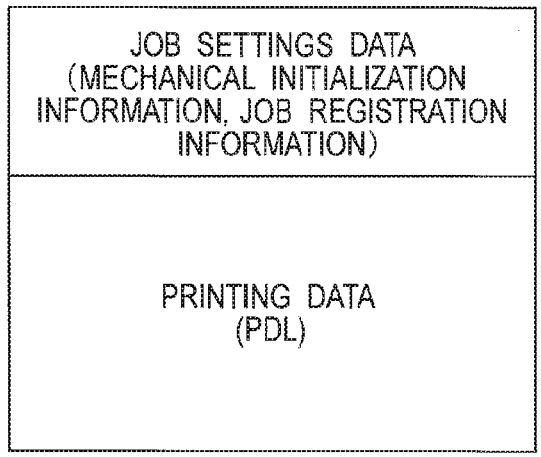
FIG. 2 is a view for explaining a configuration of print job data generated by an information processing device of the printing system shown in FIG. 1.

The print job data generated by the print job data generating unit 11 includes, as shown in FIG. 2, job settings data that includes mechanical initialization information and job registration information, and printing data in the PDL format. In the job settings data, the mechanical initialization information and the job registration information are described in a format such as CSV (Comma Separated Values) format that can be parsed without performing the RIP processing.

The mechanical initialization information is information related to the settings required for mechanical initialization performed in the printing machine 3. The mechanical initialization is a process to recalibrate mechanical parts such as a sheet conveying mechanism or an inkjet head that constitute a printer unit 21, which will be described later, according to the print job data received in the printing machine 3. The mechanical initialization information includes information such as a sheet size and the maximum number of drops to be discharged from the inkjet head per pixel when printing the data.

The job registration information is information necessary for job registration performed in the printing machine 3. In the job registration, the print job data received in the printing machine 3 is registered in a job list 51 which will be described later. The job registration information includes information such as a job name and an owner name.

The inputting unit 12 receives input of various instructions and information from the user. The inputting unit 12 includes a keyboard, a mouse, and the like.

The displaying unit 13 displays various input screens and the like. The displaying unit 13 is a liquid crystal display and the like.

The communicating unit 14 connects the information processing device 2 to the network 4. Accordingly, the information processing device 2 can communicate with the printing machine 3.

The printing machine 3 generates image data based on the print job data generated by the information processing device 2, and performs printing based on the generated image data. The printing machine 3 includes the printer unit 21, a controlling unit 22, a storing unit 23, an operation panel 24, and a communicating unit 25.

The printer unit 21 prints an image on a sheet while transporting the sheet, and transports the printed sheet to discharge it. The printer unit 21 includes a not-shown sheet conveying mechanism having rollers and the like to transport the sheet, and a not-shown inkjet head to discharge the ink onto the sheet to performing the printing, and the like.

The controlling unit 22 controls the operation of the entire printing machine 3. The controlling unit 22 includes an RIP preprocessing unit 31, an RIP processing unit 32, and a printing controlling unit 33. The CPU provided in the printing machine 3 executes various computer programs stored in the storage device such as HDD to realize various sections that constitute the controlling unit 22.

The RIP preprocessing unit 31 performs, upon receiving the print job data from the information processing device 2, RIP preprocessing. The RIP preprocessing is a process performed before the RIP processing unit 32 performs the RIP processing. In the RIP preprocessing, the mechanical initialization information and the job registration information are obtained from the job settings data by performing simple parsing of the print job data, and mechanical initialization requesting based on the obtained mechanical initialization information and job registration based on the obtained job registration information are performed. The RIP preprocessing unit 31 includes a simple parsing unit 41, a job registering unit 42, and a mechanical initialization requesting unit 43.

The simple parsing unit 41 performs, as the simple parsing of the print job data, parsing of the job settings data to obtain the mechanical initialization information and the job registration information.

The job registering unit 42 registers, based on the job registration information, a print job to the job list 51.

The mechanical initialization requesting unit 43 transmits a mechanical initialization request to the printer unit 21 based on the mechanical initialization information.

The RIP processing unit 32 performs the RIP processing on the printing data included in the print job data and generates image data.

The printing controlling unit 33 controls, based on the image data generated by the RIP processing unit 32, the printer unit 21 to perform the printing.

The storing unit 23 stores therein the job list 51. The job list 51 is a list of the print job data received in the printing machine 3. The job list 51 maintains the information such as the job name and the owner name of each print job data. The storing unit 23 is constituted by a storage device such as HDD.

The operation panel 24 displays images of various input screens and the like and accepts input operations performed by the user. The operation panel 24 includes a not-shown displaying unit having a liquid crystal display panel and the like for displaying images, and a not-shown inputting unit having various operation buttons and a touch panel.

The communicating unit 25 connects the printing machine 3 to the network 4. Accordingly, the printing machine 3 can communicate with the information processing device 2.

Subsequently, the operation of the printing system 1 will be described below.

When the image data generated by the application in the information processing device 2 is to be printed by the printing machine 3, the print job data generating unit 11 causes the displaying unit 13 to display a print settings screen (not-shown) according to the operation performed by the user for the inputting unit 12.

When various settings are input on the print settings screen by operating the inputting unit 12 and an instruction to start the printing is given, the print job data generating unit 11 generates, based on the contents of the input settings, the image data, and the like, the print job data shown in FIG. 2. Specifically, the print job data generating unit 11 generates the job settings data including the mechanical initialization information and the job registration information to be used in the printing machine 3, which is described in a format such as the CSV format that can be parsed without performing the RIP processing. Moreover, the print job data generating unit 11 generates, based on the image data and the like, the printing data in the PDL format. Accordingly, the print job data generating unit 11 generates the print job data that includes the job settings data and the printing data.

The communicating unit 14 transmits to the printing machine 3 via the network 4, the print job data generated by the print job data generating unit 11.

Upon receiving the print job data from the information processing device 2, the printing machine 3 performs the printing. The operation performed by the printing machine 3 at this stage will be described below, with reference to a flowchart of FIG. 3.

Figure 3:
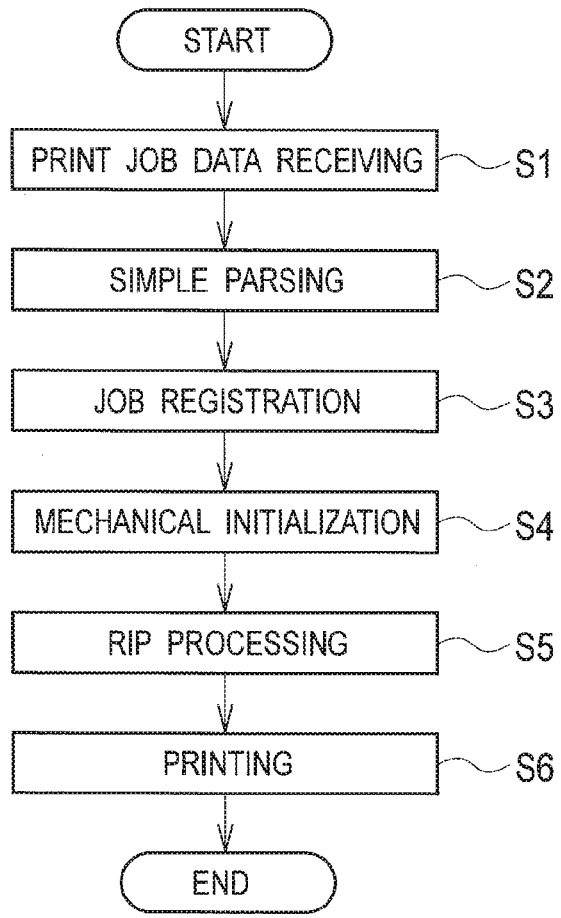
FIG. 3 is a flowchart for explaining an operation of a printing machine of the printing system shown in FIG. 1.

At Step S1 of FIG. 3, the communicating unit 25 of the printing machine 3 receives the print job data from the information processing device 2 via the network 4.

At Step S2, the simple parsing unit 41 obtains the print job data from the communicating unit 25 and performs simple parsing of the obtained print job data. Specifically, the simple parsing unit 41 parses the job settings data included in the print job data to obtain the mechanical initialization information and the job registration information. The simple parsing unit 41 outputs the job registration information to the job registering unit 42, and outputs the mechanical initialization information to the mechanical initialization requesting unit 43. Moreover, the simple parsing unit 41 transmits the simply-parsed print job data to the RIP processing unit 32.

At Step S3, based on the job registration information input from the simple parsing unit 41, the job registering unit 42 registers the print job. Specifically, the job registering unit 42 correspondingly adds to the job list 51, information such as the job name and the owner name included in the job registration information.

At Step S4, the mechanical initialization requesting unit 43 transmits the mechanical initialization request to the printer unit 21 based on the mechanical initialization information input from the simple parsing unit 41. Accordingly, the printer unit 21 starts the mechanical initialization based on the mechanical initialization information. Moreover, if the printing for the print job received in the printing machine 3 prior to the current print job has not ended, the mechanical initialization requesting unit 43 waits till the completion of that printing and then transmits the mechanical initialization request.

At Step S5, the RIP processing unit 32 performs the RIP processing on the printing data included in the print job data and generates image data. Specifically, first, the RIP processing unit 32 performs parsing of the printing data. Then, the RIP processing unit 32 rasterizes the printing data and generates image data in bitmap format.

At Step S6, the printing controlling unit 33 controls the printer unit 21 to perform the printing. Specifically, the printing controlling unit 33 causes the sheet conveying mechanism of the printer unit 21 to transport the sheet, and based on the image data, causes the inkjet head to discharge the ink and print an image on the sheet. Once the printing of the number of sheets specified in the print job data is completed, the series of operations ends.

Figure 4:
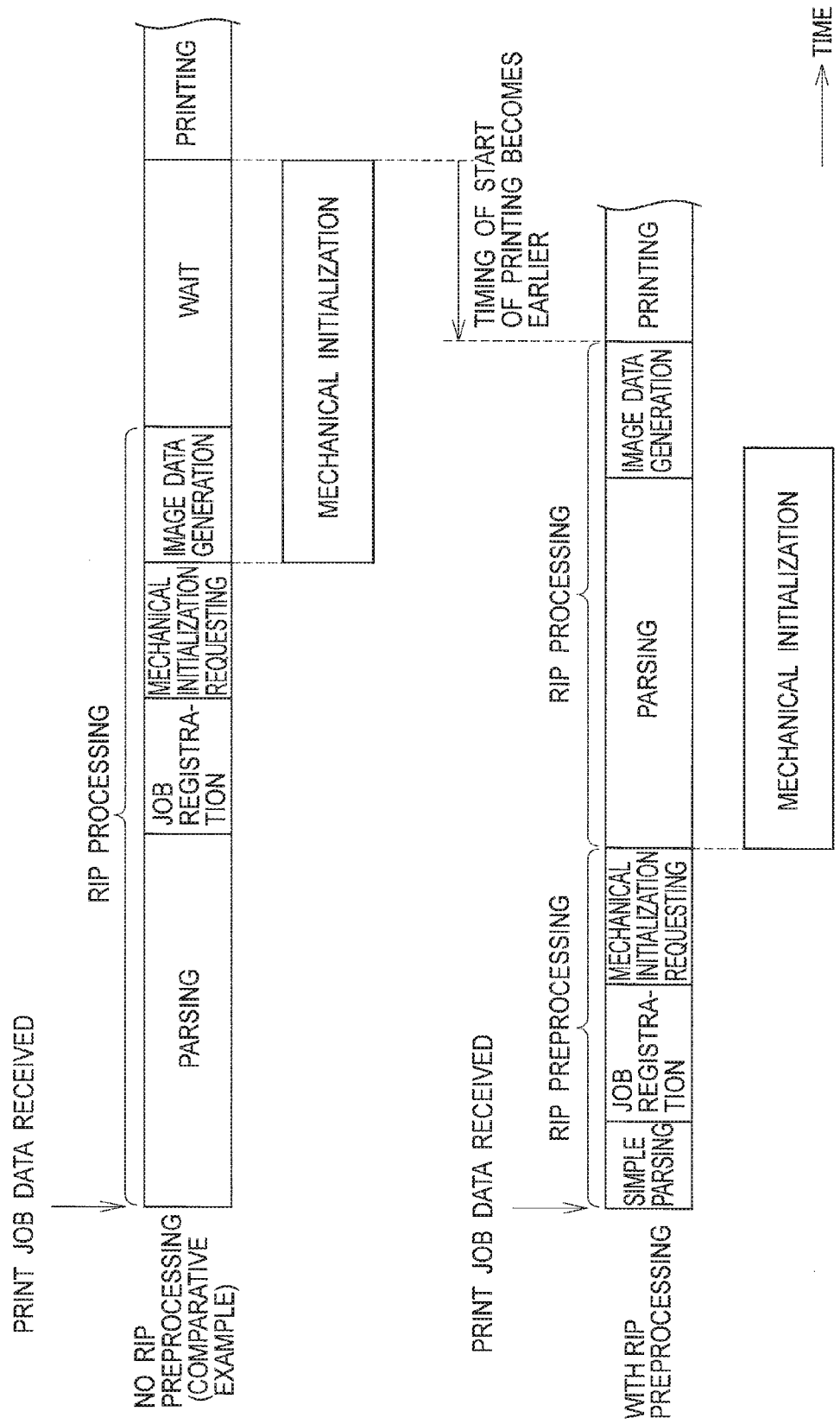
FIG. 4 is a timing chart for explaining processes performed in the printing machine of the printing system shown in FIG. 1 upon receiving the print job data.

According to the operations described above, once the printing machine 3 receives the print job data, as shown in a lower part of FIG. 4, the simple parsing of the print job data, the job registration, and the mechanical initialization requesting are performed as a part of the RIP preprocessing. In the operations explained in the lower part of FIG. 4, the simple parsing ends in a shorter time than the time required for parsing in the RIP processing. After the RIP preprocessing is completed, the RIP processing and the mechanical initialization start, where the mechanical initialization runs in parallel with the RIP processing. Once the mechanical initialization and the RIP processing are completed, the printing starts in the printing system 1.

In contrast, as a comparative example, a timing chart of processes performed in the conventional printing machine upon receiving print job data in the PDL format, which does not include the job settings data of the present embodiment, is shown in the upper part of FIG. 4.

In the comparative example, parsing in the RIP processing is started when the print job data is received in the printing machine. By performing the parsing, the job registration information and the mechanical initialization information are obtained, and the job registration and mechanical initialization requesting are performed. Then, image data generation (rasterization) and the mechanical initialization included in the RIP processing are started.

In the comparative example, even if the image data generation is completed, the printing cannot be started until the mechanical initialization is completed. Therefore, as shown in the example of FIG. 4, in the process of the comparative example, if the mechanical initialization takes more time than the time required for the image data generation, the printing is started only after waiting until the mechanical initialization is completed.

Thus, in the process of the comparative example shown in the upper part of FIG. 4, because the time during which the mechanical initialization runs in parallel with the RIP processing is short, the time at which the printing is started gets delayed compared to the process of the present embodiment shown in the lower part of FIG. 4. In other words, in the process of the present embodiment, because the mechanical initialization can be run in parallel with the data parsing involved in the RIP processing, the printing can be started earlier compared to the process of the comparative example.

Moreover, in the process of the present embodiment shown in the lower part of FIG. 4, the job registration is performed in the RIP preprocessing. With this configuration, before the RIP processing is started, the job list 51 that includes the current print job data can be displayed on the operation panel 24 of the printing machine 3 or the displaying unit 13 of the information processing device 2 depending on the operation performed by the user. Accordingly, even during the RIP processing of the previous print job data, the user can immediately check whether the current print job data is received in the printing machine 3.

On the other hand, in the process of the comparative example shown in the upper part of FIG. 4, because the job registration is performed after the data is parsed in the RIP processing, the job registration cannot be performed along with the RIP processing of the previous print job data. For this reason, in the process of the comparative example, during the RIP processing of the previous print job data, the user cannot confirm whether the current print job data is received in the printing machine.

As described above, in the printing system 1, the print job data generating unit 11 of the information processing device 2 generates the print job data that includes the job settings data that includes the mechanical initialization information and the job registration information described in a format that can be parsed without performing the RIP processing and the printing data in the PDL format. Before the RIP processing unit 32 performs the RIP processing, the RIP preprocessing unit 31 of the printing machine 3 parses the job settings data included in the print job data to obtain the mechanical initialization information and the job registration information, and performs the mechanical initialization requesting based on the mechanical initialization information and the job registration based on the job registration information.

Accordingly, in the printing machine 3, the mechanical initialization can be started before the RIP processing starts. With this configuration, the mechanical initialization can run in parallel with the RIP processing and as a result, for a longer time. This configuration enables the printing to be started earlier. Moreover, because the job registration can be performed before the RIP processing starts, the job registration can be performed even along with the RIP processing of the previous print job data. In this manner, according to the printing system 1, the mechanical initialization and the job registration can be performed efficiently, and the processes performed when the print job data is received in the printing machine 3 can be performed efficiently.

Moreover, in the above-described embodiment, even if the job settings data included in the print job data includes the mechanical initialization information and the job registration information, any one of these two types of information can be omitted. When the mechanical initialization information or the job registration information is omitted, the mechanical initialization information or the job registration information included in the job settings data is obtained in the RIP preprocessing performed in the printing machine 3, and according to the obtained information, the mechanical initialization requesting, or the job registration is performed.

In the above-described embodiment, even if the printing method of the printing machine 3 is assumed to be an inkjet printing method, the other printing methods can be used.

The present invention is not limited to the above-described embodiments and the structural components can be realized by modifying them without departing from the gist at the implementation stage. Moreover, various inventions can be constituted by appropriately combining the various structural components disclosed in the above-described embodiments. For example, some of the structural components among all the structural components described in the embodiments can be omitted.

What is claimed is:

1. A printing system comprising:
an information processing device that generates print job data; and
a printing machine that generates image data based on the print job data generated by the information processing device and performs printing based on the generated image data, wherein the information processing device comprises:
- a print job data generator that generates print job data including
  - job settings data which includes at least one of mechanical initialization information and job registration information to be used in the printing machine and which is described in a format that can be parsed without performing RIP processing and
  - printing data in PDL format; and
- a transmitter that transmits the print job data to the printing machine, and the printing machine comprises:
- a receiver that receives the print job data transmitted from the information processing device;
- an RIP processor that performs the RIP processing on the printing data included in the print job data and generates the image data; and
- an RIP pre-processor that parses the job settings data included in the print job data to obtain at least one of the mechanical initialization information and the job registration information, and performs at least one of mechanical initialization requesting based on the mechanical initialization information and job registration based on the job registration information before the RIP processor performs the RIP processing.

2. An information processing device comprising:
a print job data generator that generates print job data including
- job settings data which includes at least one of mechanical initialization information and job registration information to be used in a printing machine and which is described in a format that can be parsed without performing RIP processing, and
- printing data in PDL format; and
a transmitter that transmits the print job data to the printing machine.

3. A printing machine that generates image data based on print job data generated by an information processing device, and performs printing based on the generated image data, the printing machine comprising:
a receiver that receives print job data including
- job settings data which includes at least one of mechanical initialization information and job registration information to be used in the printing machine and which is described in a format that can be parsed without performing RIP processing, and
- printing data in PDL format;
an RIP processor that performs the RIP processing on the printing data included in the print job data and generates image data; and
an RIP pre-processor that parses the job settings data included in the print job data to obtain at least one of the mechanical initialization information and the job registration information, and performs at least one of mechanical initialization requesting based on the mechanical initialization information and job registration based on the job registration information before the RIP processor performs the RIP processing.

* * * * *